H. J. HAIGH.
BAKING PAN.
APPLICATION FILED JAN. 10, 1918.

1,280,019.

Patented Sept. 24, 1918.
2 SHEETS—SHEET 1.

Inventor
Harry J. Haigh
By his Attorneys

H. J. HAIGH.
BAKING PAN.
APPLICATION FILED JAN. 10, 1918.
1,280,019.
Patented Sept. 24, 1918.
2 SHEETS—SHEET 2.
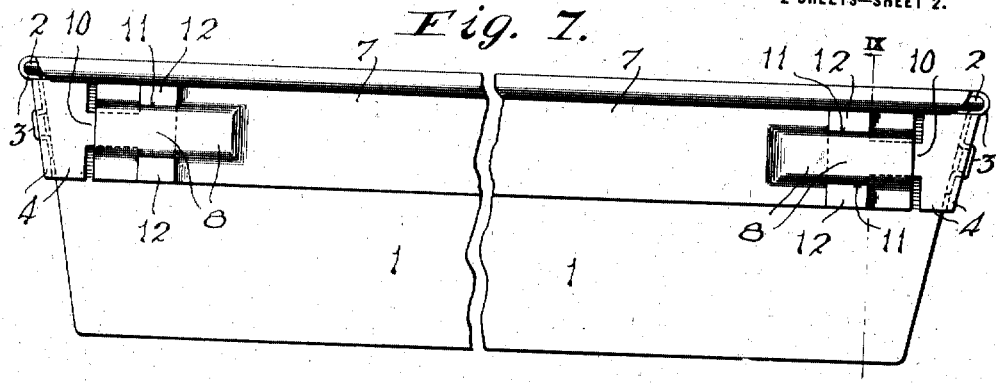
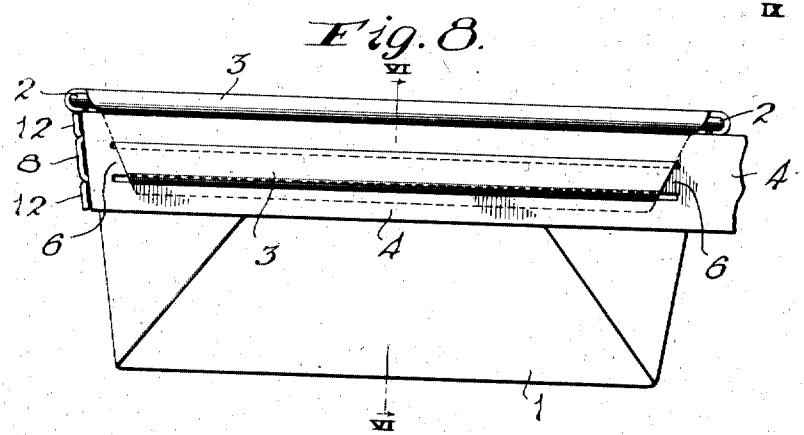
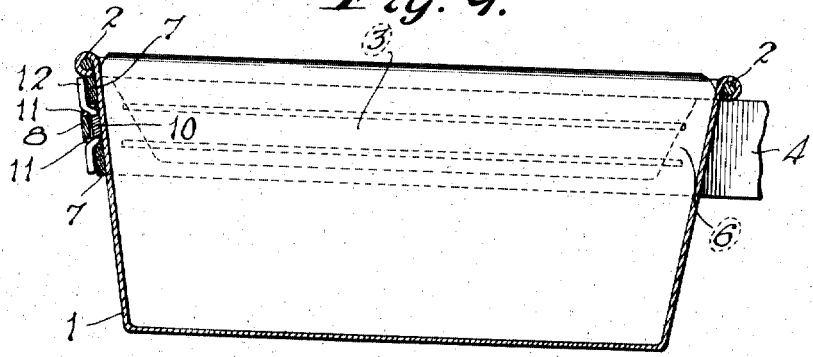
Inventor
Harry J. Haigh
By his Attorneys

UNITED STATES PATENT OFFICE.

HARRY J. HAIGH, OF STAPLETON, NEW YORK.

BAKING-PAN.

1,280,019.  Specification of Letters Patent.  Patented Sept. 24, 1918.

Application filed January 10, 1918. Serial No. 211,260.

*To all whom it may concern:*

Be it known that I, HARRY J. HAIGH, a citizen of the United States, and resident of Stapleton, county of Richmond, city and State of New York, have invented certain new and useful Improvements in Baking-Pans, (Case #7,) of which the following is a specification.

This invention relates to that class of baking pans in which a plurality of individual pans are connected together to form a multiple pan, or a set of pans adapted to be handled as a unit.

The invention has for one of its objects the provision of a multiple pan in which the individual pans are rigidly held together in spaced relation without the employment of rivets or other connecting or fastening means projecting through the pan walls or into the interior of the pan, which would result in the formation of marks on the articles baked in the pan and also render the pan unsanitary and difficult to thoroughly clean.

A further important object of the invention is to provide means for connecting the pans of a set together, which is adapted to be interlocked with the metal of the several pans to permanently connect the pans of the set with each other.

Another important object of the invention is to provide a connecting frame or device and means whereby a plurality of individual pans may be secured within said frame and interlocked therewith without the employment of extraneous fastening devices.

A further object is to provide a multiple pan in which the body part of each individual pan is permanently interlocked with a connecting frame, without the employment of fastening devices extending through or within the pans and without the formation of projections or recesses on the inside of the pan, and in which the individual pans are securely held against relative vertical and lateral movement by the interlocking connections between the pans and frame.

Another important object of the invention is the provision of a multiple pan constructed of a minimum number of parts, and in which the parts are of simple and inexpensive construction and are adapted to be readily assembled.

Figure 1:
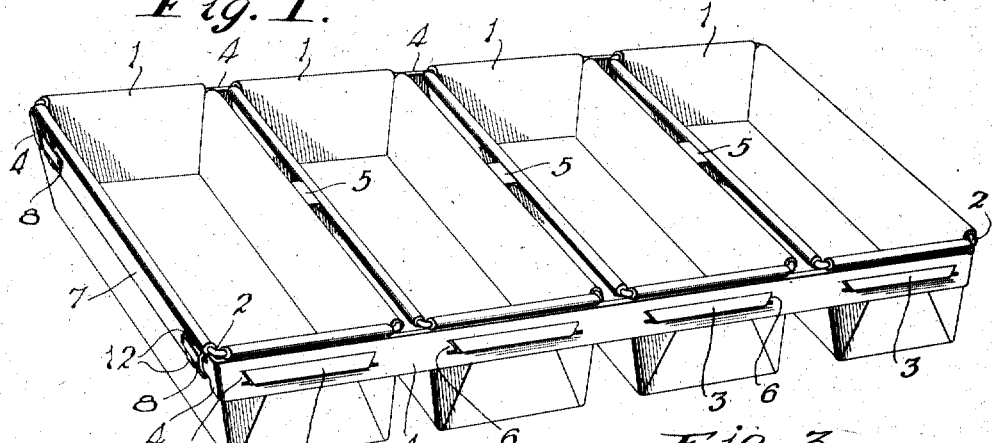
Figure 2:
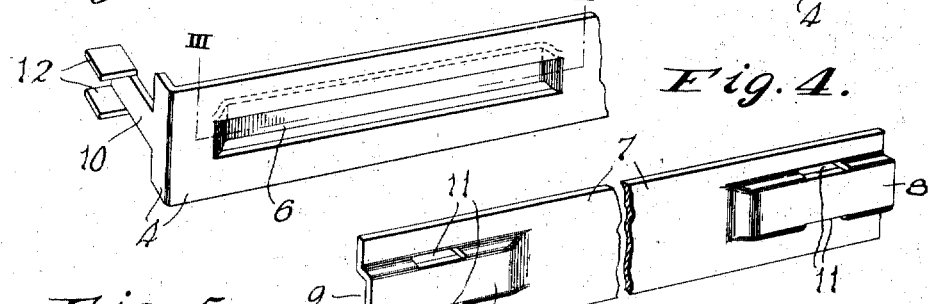
Figure 3:
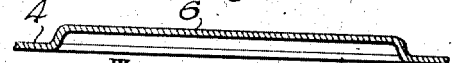
Figure 4:
Figure 5:
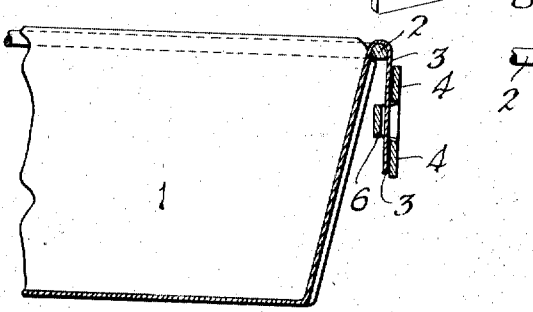
Figure 6:
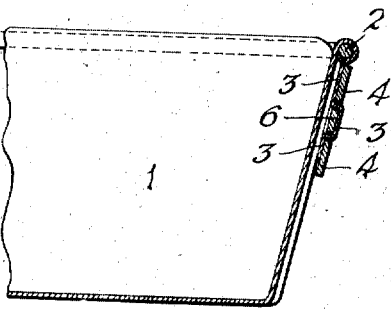

In the accompanying drawings, Figure 1 is a perspective view of a multiple pan embodying the invention;

Fig. 2 an enlarged fragmentary perspective view showing one end of one of the side bars of the pan frame;

Fig. 3 a horizontal sectional view on the line III—III of Fig. 2;

Fig. 4 an enlarged perspective view of one of the end bars of the pan frame;

Fig. 5 a fragmentary vertical section showing the manner of assembling the pan;

Fig. 6 a fragmentary vertical section on the line VI—VI of Fig. 8;

Fig. 7 an end elevation of the multiple pan;

Fig. 8 a fragmentary side elevation of the multiple pan showing one of the end pans of the set and a part of the frame; and Fig. 9 a vertical section on the line IX—IX of Fig. 7.

In the accompanying drawings, the multiple pan is shown as comprising four individual pans 1, permanently held in spaced relation within a connecting frame. It will be obvious, however, that any desired number of individual pans may be connected together to form a multiple pan. The individual pans 1 are of rectangular form and are pressed, stamped, or otherwise formed from a sheet metal blank. The upper edge of the pan is stiffened and beaded by bending the side walls of the pan outwardly and downwardly around a rectangular wire reinforcing frame 2. The end walls of the individual pans are formed with integral extensions or tongues 3 at their upper edges, which are adapted to be interlocked with the side bars 4 of the connecting frame. The adjacent side walls of the individual pans 1 are preferably connected and held in fixed relation with each other by spacing devices 5, preferably constructed as shown and described in my copending application Serial No. 191,566, filed September 15, 1917.

The side bars 4 of the pan-connecting frame are stamped, or otherwise formed, from relatively heavy sheet metal, to the form shown in Figs. 2, 3 and 5. The extensions or tongues 3 of the end walls of the pans 1 are bent outwardly and downwardly around the end portions of the wire reinforcing frame 2 and passed between the outer sides of the offset portions 6 of the side bars 4 and the inner sides of said bars, as shown in Fig. 5. The offset portions 6 are formed by slotting the bars 4 along parallel lines at intervals and forcing the body portion of the bars between the slots laterally, as shown in Figs. 2, 3 and 5. After the tongues or extensions 3 of the end walls of the pans 1 have been passed between the offset portions 6 and the main portions of the bars 4, said offset portions 6 are forced back into the planes of the body portions of the bars 4, thus interlocking the tongues 3 with the bars, and said bars 4 are pressed inwardly into close engagement with the end walls of the pans 1, as shown in Fig. 6. The offset portions 6 may be forced back into the planes of the body portions of the bars, either before the bars are pressed against the ends of the pans, or by the act of pressing the bars closely against the pans. When the bars 4 are pressed against the ends of the pans below the end members of the wire reinforcing frame 2, they press the tongues 3 closely against the end walls of the pans and bend said tongues closely about the wire frame 2, an offset portion of each tongue 3 being thus formed between the upper edge of the bar and the under side of the wire frame 2, as shown more clearly in Fig. 6. The tongues or extensions 3 are thus tightly interlocked or interlaced with the side bars 4, and said tongues are also preferably formed of substantially the same width as the length of the offset portions 6 to further assist in rigidly holding the pans 1 in fixed relation with the side bars 4. It will be seen that by interlacing the end walls of the pans 1 with the side bars 4, as described, the pans are rigidly and permanently held against both vertical and lateral movement relatively to each other and to the connecting frame.

The side bars 4 of the pan-connecting frame may be connected with each other in any suitable manner to rigidly hold said bars closely against the end walls of the pans 1 after said bars have been interlocked with the extensions 3 of the pans as above described. The connecting means shown in the drawings comprises a pair of end bars 7 each of which is stamped or otherwise shaped as shown in Figs. 4 and 7. Each end bar 7 is formed with offset portions 8 extending inwardly from each end thereof and forming a recess or channel 9. The ends of the side bars 4 are bent inwardly toward each other around the corners of the end pans of the set, and each inwardly bent end of said bars is formed with a reduced inwardly extending portion 10 adapted to lie in the adjacent channel 9 in one of the end bars 7. Each end bar is provided with a pair of apertures or slots 11 adjacent each end thereof at opposite sides of the channel 9, and each extension 10 on the side bars 4 is provided with a pair of tongues 12 adapted to extend outwardly through said slots 11 when the end bars are placed against the outer side walls of the end pans of the set. The end bars 7 are locked in place, and interlocked with the side bars 4, by bending the tongues 12 against the outer sides of the end bars 7, as shown in Figs. 1, 7, 8 and 9. The upper edges of the end bars 7 lie closely under the beaded edges of the outer side walls of the end pans, as shown in Figs. 7, 8 and 9.

What I claim is:

1. A multiple baking pan comprising a plurality of individual pans arranged side by side and having their end walls provided with integral tongues, a pair of side bars extending along the end walls of the individual pans and each provided with spaced pairs of parallel superposed slots, each of the tongues on the end walls of the pans passing through two adjacent superposed parallel slots in said bars in opposite directions, and means for holding said side bars against the end walls of the pans.

2. A multiple baking pan comprising a row of individual pans arranged side by side in spaced relation and each having a reinforcing wire secured about its upper edge exteriorly thereof, a pair of side bars extending along the end walls of the row of pans under the reinforcing wires and provided with spaced pairs of superposed slots, tongues formed on the upper edges of the end walls of each pan and bent outwardly and downwardly about the reinforcing wires, each tongue having upper and lower portions confined between the adjacent pan wall and one of the side bars and an intermediate portion passed in opposite directions through a pair of the superposed slots in one of the side bars, the side edges of each tongue engaging the opposite ends of one of the slots through which it is passed, and means for holding the side bars against the end walls of the pans.

3. A multiple pan comprising a plurality of rectangular individual pans arranged side by side in spaced relation and each having its end walls provided with integral tongues, and a rigid rectangular frame having side bars extending along the end walls of the pans and end bars extending along the outer side walls of the end pans, said side bars being provided with spaced pairs of horizontally extending slots and each of said tongues being interlocked with one of the side bars by being passed through one of said pairs of slots.

4. A multiple pan comprising a set of individual pans arranged side by side in spaced relation and each having a reinforcing wire secured about its upper edge, a pair of flat side bars extending along opposite sides of the set of pans under the reinforcing wires and formed with spaced pairs of superposed horizontal slots, tongues formed on the upper edge of each pan at opposite ends thereof, each of said tongues being interlaced intermediate its ends through a pair of superposed horizontal slots in the adjacent side bar and having its inner end bent about the reinforcing wire and confined between the adjacent pan wall and side bar, a pair of end bars extending between the ends of the pair of side bars, and interlocking connections between the ends of said end bars and the adjacent ends of the side bars.

5. A multiple pan comprising a set of individual pans arranged side by side in spaced relation and each having a reinforcing wire secured about its upper edge, a pair of flat side bars extending along opposite sides of the set of pans under the reinforcing wires, tongues formed on the upper edge of each pan at opposite ends thereof, each of said tongues being interlaced intermediate its ends with the adjacent side bar and having its inner end bent about the reinforcing wire and confined between the adjacent pan wall and side bar, and a pair of end bars extending between the ends of said pair of side bars each having apertured end portions, said connecting bars being formed with tongues passing through said apertures and bent against the opposite face of the end bar.

6. A multiple pan comprising a plurality of rectangular individual pans arranged side by side in spaced relation and each having its end walls provided with integral tongues, a pair of side bars extending along the end walls of the pans to which the tongues on said end walls are rigidly secured, said side bars having the ends thereof bent inwardly around the end pans and formed with lugs, and end bars extending along the outer side walls of the end pans and having apertures through which the lugs on the side bars project, the projecting ends of said lugs being bent upon the outer faces of the end bars.

7. A multiple pan comprising a plurality of individual pans arranged in a single row and each having the upper edge thereof provided with oppositely disposed depending tongues, rigid side bars extending along opposite sides of the row of pans and formed with spaced pairs of superposed horizontal slots, each of said tongues passing in opposite directions through a pair of superposed slots in one of the bars and being gripped between the abutting edges of the body part of the bar bounding said slots, and means for holding the bars against the adjacent walls of the pans.

This specification signed this ninth day of January, A. D. 1918.

HARRY J. HAIGH.